United States Patent
Green et al.

(10) Patent No.: US 9,200,984 B2
(45) Date of Patent: Dec. 1, 2015

(54) CONDITION BASED LIFING OF GAS TURBINE ENGINE COMPONENTS

(71) Applicant: Solar Turbines Incorporated, San Diego, CA (US)

(72) Inventors: Richard James Green, Poway, CA (US); Mark Alfred Novaresi, San Diego, CA (US); Sudhakar Bollapragada, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 14/052,572

(22) Filed: Oct. 11, 2013

(65) Prior Publication Data

US 2015/0105966 A1    Apr. 16, 2015

(51) Int. Cl.
*G01M 15/14*    (2006.01)
*G07C 5/00*    (2006.01)

(52) U.S. Cl.
CPC .............. *G01M 15/14* (2013.01); *G07C 5/006* (2013.01)

(58) Field of Classification Search
None
See application file for complete search history.

(56) References Cited

U.S. PATENT DOCUMENTS

| 3,584,507 A | 6/1971 | Hohenberg |
| 5,042,295 A * | 8/1991 | Seeley ...................... 73/112.03 |
| 5,447,059 A | 9/1995 | Miller et al. |
| 5,455,777 A | 10/1995 | Fujiyama et al. |
| 6,343,251 B1 * | 1/2002 | Herron et al. ................. 701/100 |
| 6,532,421 B2 | 3/2003 | Miwa |
| 6,636,813 B1 * | 10/2003 | Isobe et al. ...................... 702/34 |
| 6,731,996 B1 | 5/2004 | MacEwen et al. |
| 6,801,871 B2 | 10/2004 | Ishii et al. |
| 6,928,391 B2 | 8/2005 | Fujiyama et al. |
| 7,016,825 B1 | 3/2006 | Tryon, III |
| 7,162,373 B1 | 1/2007 | Kadioglu et al. |
| 7,243,042 B2 | 7/2007 | Plotts et al. |
| 7,480,573 B2 | 1/2009 | Toyosada |
| 7,810,385 B1 * | 10/2010 | Narcus ....................... 73/112.01 |
| 7,822,577 B2 * | 10/2010 | Sathyanarayana et al. ... 702/182 |
| 8,069,708 B2 | 12/2011 | Kunze et al. |
| 8,370,046 B2 | 2/2013 | Jiang et al. |
| 2005/0085989 A1 * | 4/2005 | Martin ......................... 701/100 |
| 2006/0116847 A1 * | 6/2006 | Plotts et al. .................. 702/136 |
| 2007/0185694 A1 | 8/2007 | Rousselier et al. |
| 2007/0272018 A1 * | 11/2007 | Shadman et al. ............... 73/579 |
| 2009/0314100 A1 * | 12/2009 | Myers ............................ 73/811 |
| 2010/0153080 A1 | 6/2010 | Khan et al. |
| 2011/0137575 A1 * | 6/2011 | Koul ............................... 702/34 |
| 2012/0290225 A1 | 11/2012 | Julian et al. |

FOREIGN PATENT DOCUMENTS

SU    1481621 A1    5/1989

* cited by examiner

*Primary Examiner* — John R Olszewski
*Assistant Examiner* — Navid Ziaeianmehdizadeh
(74) *Attorney, Agent, or Firm* — Procopio, Cory, Hargreaves & Savitch LLP

(57) ABSTRACT

A system and methods for the condition based lifing of a gas turbine engine component is disclosed. The system and methods determine the stress and caused by fatigue and creep for each load cycle of the gas turbine engine, and use a ductility exhaustion method to combine the fatigue and creep strain rates determined from the fatigue and creep stresses to determine the remaining useful of the gas turbine engine component.

12 Claims, 5 Drawing Sheets

CONDITION BASED LIFING OF GAS TURBINE ENGINE COMPONENTS

TECHNICAL FIELD

The present disclosure generally pertains to gas turbine engines, and is more particularly directed toward a condition based lifing process and system for components of a gas turbine engine.

BACKGROUND

Gas turbine engines include an inlet, a compressor section, a combustor section, a turbine section, and an exhaust. The operating conditions of the gas turbine engine result in creep and fatigue damage to the various components of the gas turbine engine. Processes and systems for determining the life of turbine components are used to predict when the components might fail so that the components can be replaced prior to failure.

U.S. Patent App. No. 2010/0153080 to K. Khirullah is directed to a method for lifespan modeling for a turbine engine component that includes determining a design-phase model of the lifespan of an turbine engine component; fusing the design-phase model with sensor data collected during operation of the turbine engine component to produce an updated model of the lifespan of the turbine engine component; and fusing the updated model with data collected during an inspection of the turbine engine component to produce an overall model of the lifespan of the turbine engine component.

The present disclosure is directed toward overcoming one or more of the problems discovered by the inventors or that is known in the art.

SUMMARY OF THE DISCLOSURE

A condition based lifing system for a component of a gas turbine engine is disclosed. The condition based lifing system includes a processor, a material data store, a gas turbine engine data store, a fatigue module, a creep module and a ductility exhaustion module. The material data store includes a stress-strain curve and a ductility exhaustion curve for a material of the component. The gas turbine engine data store includes operating conditions of one or more load cycles of the gas turbine engine, each load cycle including a ramp period and a dwell period.

The fatigue module is configured to determine a plastic stress of the component for each ramp period, and determine a plastic strain rate from the plastic stress. The creep module is configured to determine a viscoplastic stress of the component for each dwell period and determine a viscoplastic strain rate from the viscoplastic stress. The ductility exhaustion module is configured to determine a remaining useful life of the component by determining an exhausted ductility of the component using the plastic strain rate, the viscoplastic strain rate, and the ductility exhaustion curve, and subtracting the exhausted ductility from an available ductility.

A method for determining the remaining useful life for a component of a gas turbine engine is also disclosed. The method includes recording field data of the gas turbine engine for each load cycle the component is in the gas turbine engine. The method also includes determining a life consumed of the component for each load cycle of the gas turbine engine. Determining the life consumed for each load cycle includes determining a ramp period life consumed using a ductility exhaustion curve for a material of the component and a ramp period stress of the load cycle determined using the field data. Determining the life consumed for each load cycle also includes determining a dwell period life consumed using the ductility exhaustion curve and a dwell period stress of the load cycle determined using the field data. Determining the life consumed for each load cycle further includes combining the ramp period life consumed and the dwell period life consumed to get a life consumed for the load cycle. The method further includes determining a total life consumed by summing the life consumed for each load cycle. The method yet further includes determining a remaining useful life of the component by subtracting the total life consumed from a declared service life.

DETAILED DESCRIPTION

The systems and methods disclosed herein include a gas turbine engine and a system for determining the remaining useful life of life limited components for a gas turbine engine. The systems and methods use a ductility exhaustion approach to combine the damaging effects of creep and fatigue. Ductility exhaustion is based on strain rate of both the plastic response during a transient portion of the load cycle, defined as the cyclic or fatigue component and the strain rate from the viscoplastic response during the dwell portion of the load cycle or creep component. The strain rate for each inelastic component is used to determine the available ductility from the material's ductility exhaustion curve. The available ductility at each strain rate is then compared with the amount of strain accumulated during that particular inelastic portion of the load cycle. Damage is considered to be the ratio of accumulated strain at a given strain rate relative to the available strain. Damage can then be summed over the load cycle and from cycle to cycle over a given time period to determine the total damage to the component. The remaining useful life of the component can then be ascertained for a given loading period based on the field data of the gas turbine engine.

Figure 1:
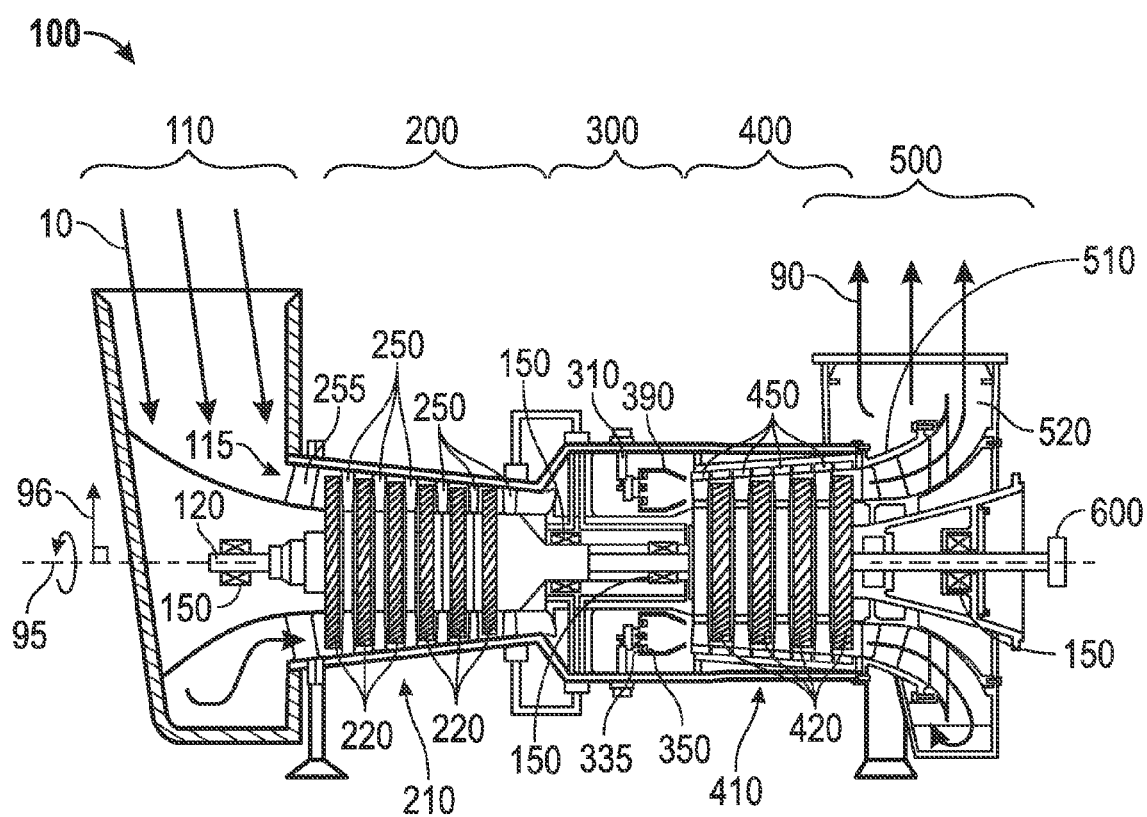
FIG. 1 is a schematic illustration of an exemplary gas turbine engine.

FIG. 1 is a schematic illustration of an exemplary gas turbine engine 100. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a shaft 120, a compressor 200, a combustor 300, a turbine 400, an exhaust 500, and a power output coupling 600. The gas turbine engine 100 may have a single shaft or a multiple shaft configuration.

The compressor 200 includes a compressor rotor assembly 210, compressor stationary vanes (stators) 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes one or more fuel injectors 310 and includes one or more combustion chambers 390. The fuel injectors 310 may be annularly arranged about center axis 95.

The turbine 400 includes a turbine rotor assembly 410 and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with single crystal turbine blades 430. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 510 and an exhaust collector 520.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as alloy x, WASPALOY, RENE alloys, alloy 188, alloy 230, INCOLOY, MP98T, TMS alloys, CMSX single crystal alloys, and exquiax alloy.

The condition based lifing system determines the damage accumulation in a life limited component of one or more load cycles of the gas turbine engine (GTE) 100 by determining the stresses and strains caused by the load cycles on the component and applying those stresses and strains to a ductility exhaustion method. The GTE 100 may be outfitted with an array of electronic instruments, such as sensors, that measure and collect the field data of the GTE 100 including the operating conditions for each load cycle and provide those conditions to the GTE data store 785. These operating conditions may include GTE inlet temperatures and the turbine temperatures, the operating pressures, the GTE loads, the GTE speeds, and the changes in time for the periods of each load cycle. A load cycle includes ramp periods, the transient periods such as start-up, ramp up, or ramp down periods, where the load and operating temperatures are increased or decreased, and dwell periods, the steady state periods, where the load and the operating temperatures and load are held relatively constant.

Test data may be used to generate a ductility exhaustion curve and a stress strain curve to be used with the condition based lifing system. The ductility exhaustion curve may be determined by using creep and tensile test data. This data provides ductility at the point of failure which is dependent on the rate of the applied strain. A ductility exhaustion curve can be created for a specific material from a range of tensile and creep tests.

Figure 2:
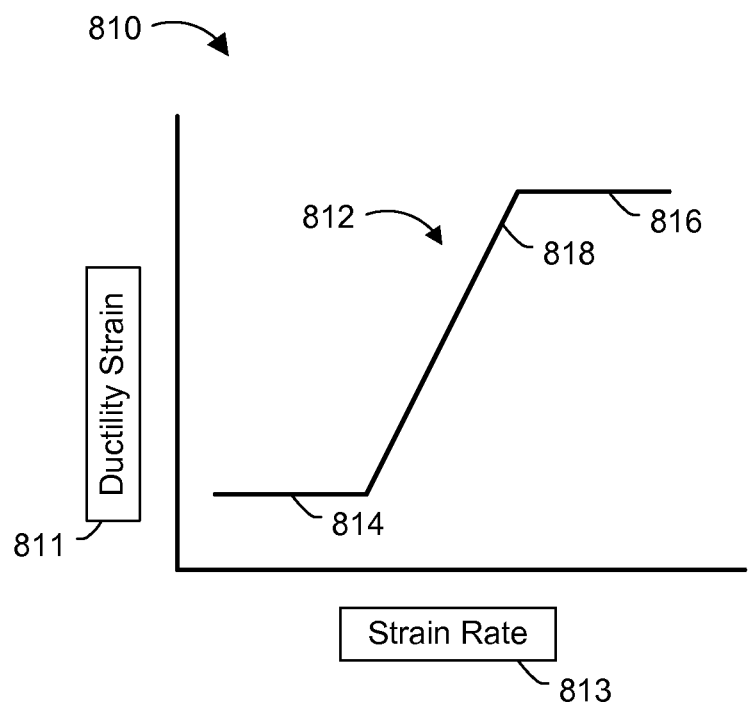
FIG. 2 is an exemplary chart of a ductility exhaustion curve.

FIG. 2 is an exemplary chart 810 of a ductility exhaustion curve 812. The ductility exhaustion curve 812 is a plot of the ductility strain (as a percentage) 811 versus the strain rate (change in strain per change in time) 813 of the material. The ductility exhaustion curve 812 may include a lower ductility shelf 814 for strain rates below a given amount where the ductility strain is constant, an upper ductility shelf 816 for strain rates above a given amount where the ductility strain is also constant, and a transition region 818 at strain rates between the lower ductility shelf 814 and the upper ductility shelf 816.

Thousands of hours of test data, including creep test data and tensile test data, was used to determine that the materials used for GTE components such as superalloys and CMSX single crystal alloys exhibit this ductility behavior including the lower ductility shelf 814, the upper ductility shelf 816, and the transition region 818. The creep tests represent data at the lower strain rates, forming the transition region 818 and lower ductility shelf 814, and the tensile tests represent the data at the higher stain rates, or upper ductility shelf 816 as illustrated in FIG. 2. Strain rate can then be used to predict the damage throughout a load cycle, including dwell periods by determining the average strain rate for the inelastic portion of the resultant stress strain curve from the load cycle. Damage is determined from the ratio of accumulated strain during the inelastic component of the load cycle, (typically predicted using numerical models) to the available ductility at the average strain rate for that inelastic portion of the load cycle.

Figure 3:
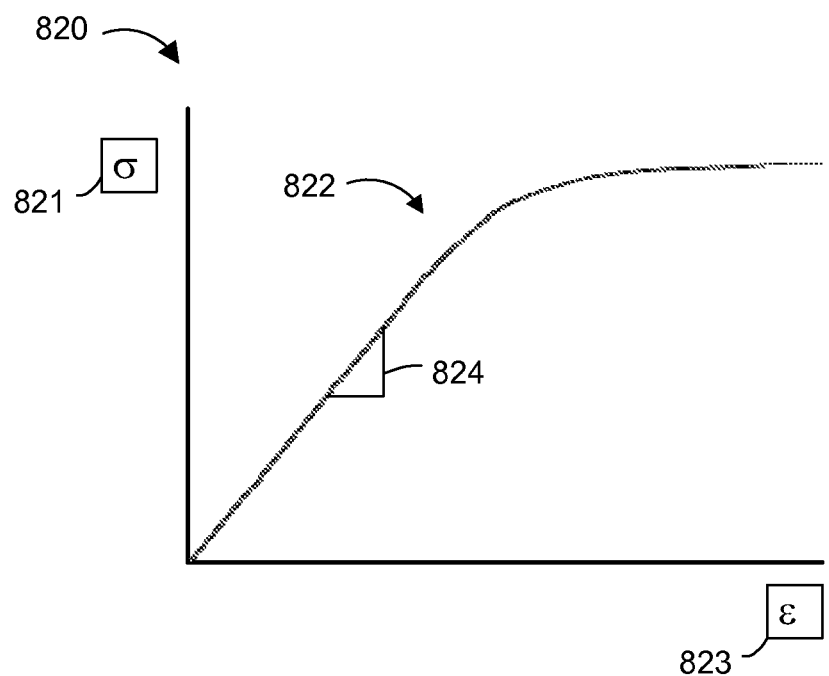
FIG. 3 is an exemplary chart of a stress-strain curve.

FIG. 3 is an exemplary chart 820 of a stress-strain curve 822. The stress-strain curve 822 may also be determined by test data. The stress-strain curve 822 illustrated demonstrates the relationship between the stress ($\sigma$) 821, the strain ($\epsilon$) 822 and Young's modulus (E) 824.

Figure 4:
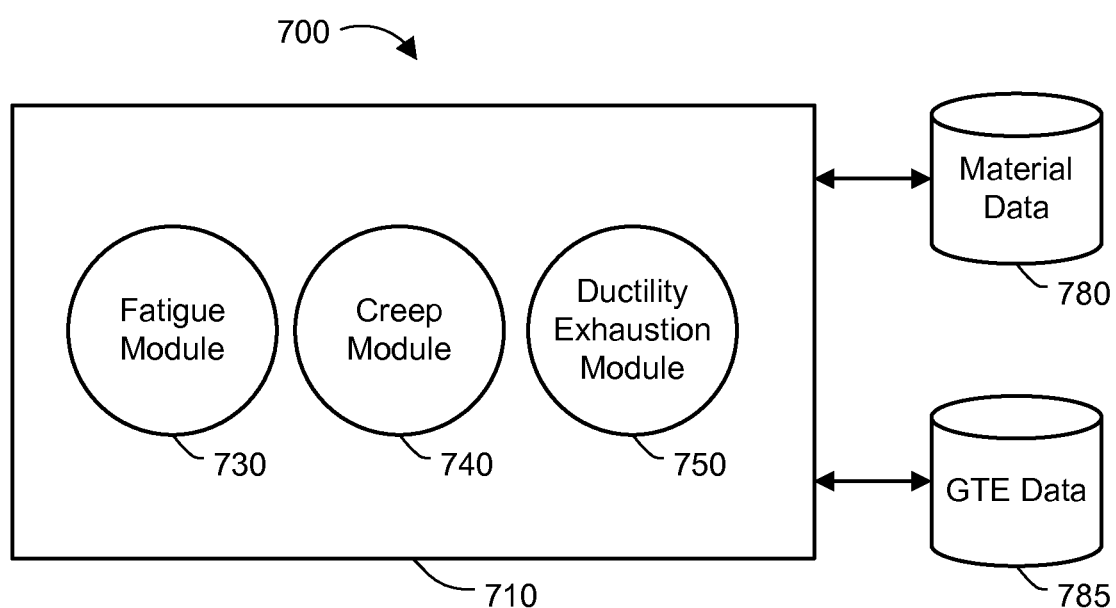
FIG. 4 is a functional block diagram of a condition based lifing system for a component of a gas turbine engine.

FIG. 4 is a functional block diagram of a condition based lifing system 700 for any number of selected or life limited components installed in the GTE 100. The condition based lifing system 700 may be implemented on a computer 710 or server that includes a processor for executing computer-software instructions, and a memory that can be used to store executable software program modules that can be executed by the processor. The memory includes a non-transitory computer readable medium used to store program instructions executable by the processor. The condition based lifing system 700 includes a fatigue module 730, a creep module 740, and a ductility exhaustion module 750.

The fatigue module 730 determines the plastic strain rate for one or more selected GTE component due to each load cycle the one or more components is installed in the GTE 100. The plastic response of the selected GTE component may be caused by the ramp periods of each load cycle. Given the complexity of most GTE components along with the complex nature of the load cycle, analyses are typically performed using a finite element analysis method. The fatigue module 730 uses the specific operating conditions of the gas turbine engine 100 during the ramp period to determine the plastic response stresses.

The fatigue module 730 may then use an elastic-plastic-stress-strain curve, such as the stress-strain curve 822 of FIG. 3 to determine the resulting plastic strain response. The resultant plastic strain rate may be determined by dividing the change in plastic strain ($\Delta\epsilon_p$) by the ramp period ($\Delta t_T$) of the load cycle. The fatigue module 730 may repeat this approach for all transient portions of the load cycle where the response is inelastic to determine the plastic stress, the plastic strain, and the plastic strain rate.

The creep module 740 determines the viscoplastic strain rate for one or more selected GTE component due to each load cycle the one or more components is installed in the GTE 100. The creep or viscoplastic response of the selected GTE component occurs during the dwell periods of the load cycle. The creep or viscoplastic strain rate is determined by calculating the stress and temperature during the start of the steady state period. A typical strain rate based creep model, such as a power law creep equation may be used to obtain the creep or viscoplastic strain from the stress and temperature over the dwell period. The complexity of the creep strain rate equation will be dependent on the level of accuracy needed and the material. The resultant creep or viscoplastic strain ($\Delta\epsilon_c$) can them be divided by the change in time over the dwell period ($\Delta t_d$) to determine the strain rate for that dwell period of a selected GTE component. Given the complexity of most GTE components along with the complex nature of the load cycle, analyses are typically performed using a finite element analysis method. The creep module 740 uses the specific operating conditions of the gas turbine engine 100 during the dwell period to determine the viscoplastic strain rates.

The selected GTE component stresses and strains are a combination of the thermal and mechanical loading during the load cycle. Wherein the thermal component of stress is subject to relaxation during dwell as a function of creep and the mechanical component of stress is subject to redistribution as a result of the plastic strains.

The ductility exhaustion module 750 determines a ratio of the available strain (ductility) to accumulated inelastic strain during a load cycle. The ratio represents the exhausted ductility and is a measure of damage of the selected GTE component. The ratio may be expressed as a percentage of damage to the selected GTE component caused by that specific load cycle. This process can be repeated for a number of different load cycles, resulting in a damage factor (or ratio) for each load cycle. The total damage is therefore a summation of these damage factors up to 100% damage, at which point the component or location (depending on the type of damage, either local or bulk) is considered to have exhausted the available ductility and therefore is no longer capable of carrying load.

The accumulated strain during a load cycle is determined from the plastic strain rate and the creep or viscoplastic strain rate. Each strain rate may be referenced against a ductility exhaustion curve for the material of the selected GTE component, such as the ductility exhaustion curve 812 illustrated in FIG. 3, to determine the accumulated damage for that strain rate. The accumulated damage for that strain rate is then divided by the available strain to return the percentage of damage caused by that strain rate.

The load cycle may include more than one ramp period and more than one dwell period. The percent damage for each ramp period and each dwell period in the load cycle are summed to determine the damage caused by the load cycle. The load cycles are determined from the operational profile of the fielded unit.

The condition based lifing system 700 may also include a material data store 780 and a GTE data store 785. The data stores may be implemented using various database technologies that allow data to be organized, stored, and retrieved from the data stores. The data stores may be implemented on the same computer 710, server, or set of servers as the condition based lifing system 700, remotely on a separate server or servers coupled to the condition based lifing system 700, or some combination.

The material data store 780 may include a ductility exhaustion curve, such as the ductility exhaustion curve 812 of FIG. 2, an amount of available ductility or available strain, and a stress-strain curve, such as the stress-strain curve 822 of FIG. 3. The stress-strain curve(s) and the ductility exhaustion curve may be stored as tables, equations, or by any other method in the material data store 780. The amount of available ductility may also be determined by using creep and tensile test data. The material data store 780 may include the data for multiple or alternate materials for each selected GTE component.

The GTE data store 785 includes the field data or operating information of the GTE 100 that is input into the fatigue module 730 and the creep module 740. This process may occur in real time as the data arrives from the GTE 100. The operating information includes, inter alia, the operating temperatures such as the GTE inlet temperature and the turbine temperature, the operating pressures, the GTE loads, the GTE speeds, and the changes in time for the periods of each load cycle. This operating information is specific to the individual GTE 100 to determine the remaining useful life of the selected GTE components. The GTE 100 may include sensors that measure the temperatures, pressures, and speed of the gas turbine engine 100 during the ramp period and the dwell periods. These measurements may be included in the GTE data store 785 and may be used to determine the ramp period stress and the dwell period stress.

In some embodiments, the condition based lifing system also includes an anisotropic module (not shown). Some GTE components are formed from single crystal materials that act as an anisotropic material, and as such, loading of these types of anisotropic or FCC structures gives rise to resolved shear stresses on each of the primary octahedral and cubic slip systems. The shear stresses in turn, result in shear deformation and permanent strain from creep or plasticity can be determined from these shear deformations. The anisotropic module extracts the isotropic stress tensors and converts the stresses provided by the fatigue module 730 and the creep module 740 into anisotropic stresses by resolving the shear stresses onto the primary octahedral and primary cubic slip systems. The newly resolved shear stresses are then used to calculate shear strains and subsequently an updated stress vector that is passed back to either the fatigue module 730 or the creep module 740. In these embodiments, the fatigue module 730 and the creep module 740 use the stress vector received from the anisotropic module to determine the plastic strain rate and the viscoplastic strain rate respectively for each load cycle.

INDUSTRIAL APPLICABILITY

Industrial gas turbine engines may operate at temperatures of 1000 degrees Fahrenheit or more and at speeds of 10,000 revolutions per minute or more. GTE components operating in these conditions often operate under high stresses and strains. To operate in such an environment, GTE components are often manufactured using expensive materials, such as superalloys and are often manufactured using expensive and complex processes.

Lifing systems for GTE components are generally conservative to avoid failure of the GTE components during operation. Failure of a GTE component during operation may lead to extensive damage to the gas turbine engine, often resulting in unintended shutdowns and loss of productivity. While avoiding failure, GTE components are often discarded and replaced well before the GTE components might fail. For example, the declared service life of GTE components is often based on a nominal, rated, or peak condition. GTEs often operate below the rated conditions. In such conditions, the actual life of the GTE components may extend well beyond the declared service life.

A condition based lifing system and process using the operating conditions or engine operational data of a particular GTE 100 with a ductility exhaustion method based on the rate of inelastic flow (for both creep (viscoplasticity) and fatigue (post yield plasticity)) may more accurately predict the damage accumulated on the GTE component and the remaining useful life of the components for that particular GTE 100.

A more accurate prediction or model of when a GTE component might fail may allow the GTE component to remain in operation longer without increasing the risk of failure. Increasing the time each GTE component remains in operation may significantly reduce the costs of operating a gas turbine engine as the expense of replacing the GTE components may occur less frequently.

Figure 5:
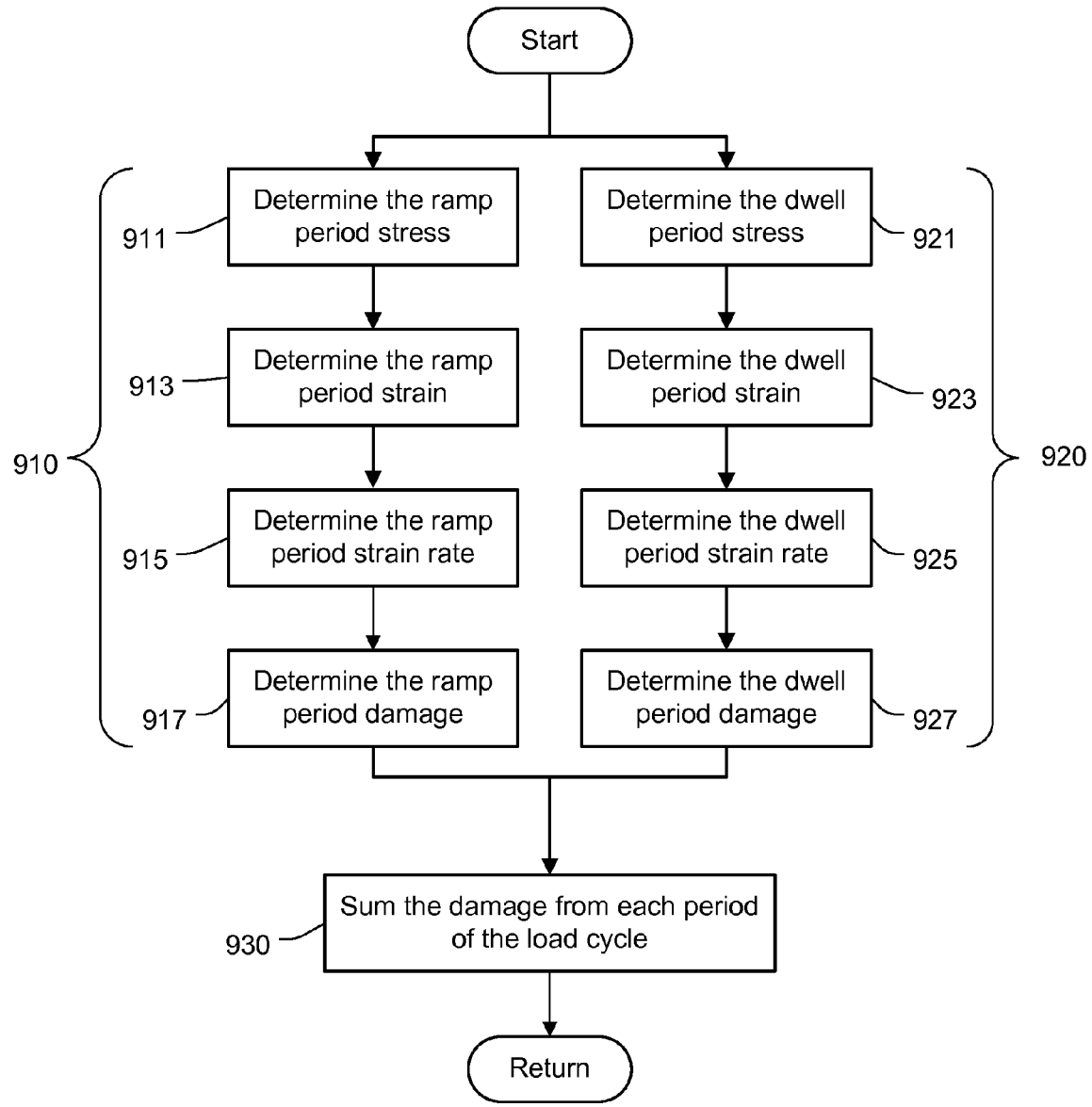
FIG. 5 is a flowchart of a process for determining the damage accumulated on a component of the gas turbine engine caused by one gas turbine engine load cycle.

FIG. 5 is a flowchart of a process for determining the damage accumulated on a GTE component caused by a gas turbine engine load cycle. The process can be performed by the condition based lifing system 700 of FIG. 4. Various steps of the process can be performed by the fatigue module 730, the creep module 740, or the ductility exhaustion module 750 of the condition based lifing system 700 of FIG. 4.

The process for determining the damage accumulated on a GTE component in the GTE 100 for one or more load cycle includes processes for determining the damage to the GTE component due to each ramp period and the damage due to each dwell period of a load cycle to account for fatigue and creep respectively of the load cycle. This process can be carried out in parallel (or in series) for each selected GTE component. As illustrated in FIG. 5, the process may include a fatigue sub-process 910 and a creep sub-process 920. The process may occur in real time as the data is received from the GTE 100.

In block 911, the fatigue sub-process 910 determines the ramp period stress or fatigue stress (plastic stress) due to the ramp period with the fatigue module 730. The ramp period stress may be determined by determining the ramp period or plastic stresses in an isotropic manner with any known model, such as a finite element analysis method.

In block 913, the fatigue sub-process 910 determines the ramp period strain with the fatigue module 730. The ramp period strain may be determined with the fatigue module 730 using a stress-strain curve developed for the material used in the GTE component, such as the stress-strain curve 822 of FIG. 3. The strain for a load cycle may be expressed as a resultant stress-strain curve over the load cycle.

In block 915, the fatigue sub-process 910 determines the ramp period strain rate with the fatigue module 730. The ramp period strain rate may be determined by the elastic plastic response curve at the given temperature and operating conditions or by other methods that correlate the ramp period strain to the length or duration of the ramp period. The ramp period strain rate may be an average of the strain rate for the inelastic portion of the ramp period.

In block 917, the fatigue sub-process 910 determines the ramp period damage or ramp period life consumed with the ductility exhaustion module 750. The ramp period damage may be determined by referencing the ramp period strain rate to the ductility exhaustion curve for the material used in the GTE component, such as the ductility exhaustion curve 812 of FIG. 2, or by using the resulting ramp period strain rate with the ductility exhaustion curve data.

In block 921, the creep sub-process 920 determines the dwell period stress or creep stress (viscoplastic stress) due to the dwell period with the creep module 740. The dwell period stress may be determined by determining the dwell period or viscoplastic stresses in an isotropic manner with any known model, such as a finite element analysis method.

In block 923, the creep sub-process 920 determines the dwell period strain with the creep module 740. The dwell period strain may be determined from calculating the stress and temperature during the dwell period and the stress and temperature in a typical strain rate based creep model, such as a power law creep equation. The creep or viscoplastic strain can be obtained from the stress and temperature over the dwell period. A creep strain curve may be used to determine the dwell period strain.

In block 925, the creep sub-process 920 determines the dwell period strain rate with the creep module 740. The resultant creep or viscoplastic strain ($\Delta\epsilon_c$) can be divided by the change in time over the dwell period ($\Delta t_d$) to determine the strain rate for that dwell period of a selected GTE component. The dwell period strain rate may be determined by a power law approach or by other methods that correlate the dwell period strain to the length or duration of the dwell period. The dwell period strain rate may be an average of the strain rate for the inelastic portion of the dwell period.

In block 927, the creep sub-process 920 determines the dwell period damage or dwell period life consumed with the ductility exhaustion module 750. The dwell period damage may be determined by referencing the dwell period strain rate to the ductility exhaustion curve for the material used in the GTE component, such as the ductility exhaustion curve 812 of FIG. 2, or by using the resulting dwell period strain rate with the ductility exhaustion curve data.

In block 930, the process sums the damage from each ramp period and each dwell period of the load cycle with the ductility exhaustion module 750. The sum of the damage for the load cycle includes the damage from at least one ramp period and at least one dwell period and may include the damage from multiple ramp periods and the damage from multiple dwell periods.

The process for determining the damage accumulated on a GTE component, in various embodiments, may add, omit, reorder, or alter the illustrated blocks. For example, the fatigue sub-process 910 may be performed concurrently to the creep sub-process 920 as illustrated, may be performed prior to the creep sub-process 920, or may be performed after the creep sub-process 920. Determining the damage for multiple ramp periods or multiple dwell periods may also be performed concurrently or serially.

Figure 6:
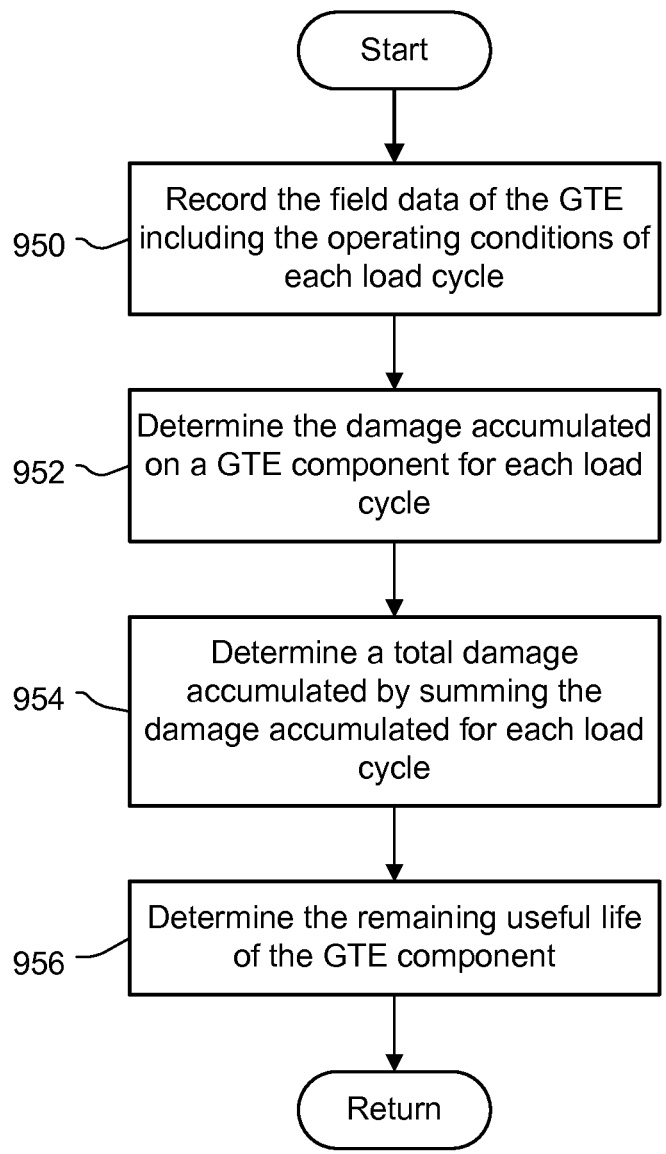
FIG. 6 is a flowchart of a process for determining the remaining useful life of a gas turbine engine component.

The process for determining the damage accumulated on a GTE component during a load cycle is used to determine the total damage accumulated on the GTE component due to all of the load cycles of the GTE 100 run with the GTE component installed in the GTE 100 and to determine the remaining useful life of the GTE component. FIG. 6 is a flowchart of a process for determining the remaining useful life of a GTE component. The process can be performed by the condition based lifing system 700 of FIG. 4. Various steps of the process can be performed by the fatigue module 730, the creep module 740, or the ductility exhaustion module 750 of the condition based lifing system 700 of FIG. 4.

In block 950, the process gathers, compiles, collects, or records the field data of the GTE 100 including the operating conditions and information related to each load cycle the component is in the GTE 100. The field data of the GTE 100 may be stored on the GTE data store 785 of the condition based lifing system 700 of FIG. 4.

In block 952, the process determines the damage accumulated on a GTE component for each load cycle of the GTE 100 run with the GTE component installed. The damage accumulated may be expressed as the ductility exhausted for each load cycle. The damage accumulated for each load cycle the GTE component is in the GTE 100 may be determined using the process of FIG. 5 using the field data of the GTE 100 with the fatigue module 730, the creep module 740, and the ductility exhaustion module 750. This may include all completed load cycles and the current, partially completed, load cycle. The damage accumulated for the current load cycle may be determined incrementally, in real time, or at the time that the remaining useful life is requested. The damage accumulated for previously completed load cycles may be determined serially as the load cycle is completed or may be determined concurrently at the time the remaining useful life is requested. The damage accumulated for previously completed load cycles may be stored in the GTE data store 785 or the material data store 780 of the condition based lifing system 700 of FIG. 4.

In block 954, the process determines the total damage accumulated on the GTE component by summing the damage accumulated on the GTE component for each load cycle. The total damage accumulated on the GTE component may be determined incrementally, in real time, or at the time that the remaining useful life is requested. The total damage accumulated on the GTE component may be determined incrementally by adding each completed load cycle to a previously determined total damage after each load cycle is completed. The previously determined total damage may be stored in the GTE data store 785 or the material data store 780 of the condition based lifing system 700 of FIG. 4.

The damage accumulated for each load cycle and the total damage accumulated may be expressed as a percentage relative to the total available damage. The damage accumulated for each load cycle and the total damage accumulated may also be expressed as the load cycle life consumed and the life consumed of the GTE component respectively. The life consumed may be expressed as the number of hours operating at a nominal, rated, or peak condition to cause the same amount or equivalent damage. The total damage may be expressed as the declared service life, the total number of hours of service the GTE component operating at a nominal, rated, or peak condition may be used in the GTE 100.

The total available damage or the declared service life may be determined using the process of FIG. 4 with data from a nominal, rated, or peak condition to determine the damage per cycle in that condition and projecting that damage out over time to where failure will occur or to where all of the ductility is exhausted based on the test data. The total available damage or the declared service life may be expressed as one-hundred percent or as the total number of hours to exhaust the ductility at the nominal, rated or peak condition. This approach can also accommodate any number of safety factors, by limiting the total available damage to less than one-hundred percent or less than the total number of hours to exhaust the ductility, depending on the application and the level of risk, the reliability level, or the confidence level associated with that application.

In block 956, the process determines the remaining useful life of the GTE component. The remaining useful life may be expressed as the percentage of the total damage or total available ductility, or as the number of hours of life remaining operating at the nominal, rated, or peak condition. The remaining useful life may be determined by subtracting the total damage accumulated from the total available damage, by subtracting the ductility exhausted from the total available ductility, or by subtracting the life consumed from the declared service life of the GTE component.

The process for determining the remaining useful life of a GTE component may be performed at the location of the GTE 100 or may be performed remotely. The condition based lifing system 700 may be located locally or remotely to the GTE 100. The condition based lifing system 700 may be used to remotely monitor and manage one or more GTEs 100 from a central location. The condition based lifing system 700 may be connected to GTE 100 via one or more networks, a local area network (LAN), other types of network, or a combination thereof to obtain the field data of GTE 100.

The process for determining the remaining useful life of a GTE component may be used by processes, methods, and systems of service for GTE 100. Such a process may use the remaining useful life to determine when to replace a particular GTE component based on the component reaching a predetermined threshold of the remaining useful life, or to determine when to perform or schedule service of the GTE 100. Determining when to perform or schedule of service may be accomplished by projecting when one or more GTE components will reach or come within a predetermined threshold of the remaining useful life. Service of GTE 100 may include overhaul, field service or modification, or refurbishing of GTE 100.

The processes and systems disclosed herein may be used on any number of GTE components simultaneously, and in particular may be used for each of the life limited GTE components of GTE 100.

Those of skill will appreciate that the various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor (e.g., of a computer), or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for determining when to replace a component in a gas turbine engine based on operating conditions for each load cycle of the gas turbine engine, each load cycle including one or more ramp periods where the load and operating temperatures are increased or decreased and one or more dwell periods where the load and the operating temperatures are held relatively constant, the method comprising:
   recording field data of the gas turbine engine for each load cycle the component is in the gas turbine engine;
   determining a life consumed of the component for each load cycle the component is in the gas turbine engine including
      determining a ramp period life consumed for each ramp period using a ductility exhaustion curve for a material of the component and a ramp period stress of the load cycle determined using the field data,
      determining a dwell period life consumed for each dwell period using the ductility exhaustion curve and a dwell period stress of the load cycle determined using the field data, and
      summing the ramp period life consumed from each ramp period and the dwell period life consumed from each dwell period to determine a life consumed for the load cycle;
   determining a total life consumed by summing the life consumed for each load cycle;
   determining a remaining useful life of the component by subtracting the total life consumed from a declared service life;
   comparing the remaining useful life of the component with a predetermined threshold; and
   replacing the component upon reaching the predetermined threshold of the remaining useful life.

2. The method of claim 1, wherein the remaining useful life is a number of cycles and hours of life remaining operating at a rated condition.

3. The method of claim 2, wherein the declared service life is a total number of cycles and hours to exhaust the ductility at a rated condition.

4. The method of claim 1, wherein the remaining useful life for the component is determined after each load cycle of the gas turbine engine.

5. The method of claim 1, wherein the material is a superalloy.

6. The method of claim 1, wherein the material is an anisotropic material.

7. A method of service, wherein when to perform service on the gas turbine engine is determined by projecting when the component will reach a predetermined threshold of the remaining useful life determined by the method of claim 1.

8. A method for determining a remaining useful life for a component in a gas turbine engine based on operating conditions for each load cycle of the gas turbine engine, the method comprising:
   recording operational data of the gas turbine engine including data for each load cycle of the gas turbine engine that the component is in the gas turbine engine, each load cycle including one or more ramp periods and one or more dwell periods, wherein the ramp periods are when the load and operating temperatures are increased or decreased and the dwell periods are when the load and the operating temperatures load are held relatively constant; determining a ramp period stress for each ramp period of each load cycle using the operational data;
   determining a ramp period strain for each ramp period from the ramp period stress using a stress-strain curve for a material of the component;
   determining a ramp period strain rate for each ramp period from the ramp period strain,
   determining a ramp period damage for each ramp period from the ramp period strain rate by using a ductility exhaustion curve for the material;
   determining a dwell period stress for each dwell period of each load cycle using the operational data;
   determining a dwell period strain for each dwell period from the dwell period stress and temperature using a creep strain curve;
   determining a dwell period strain rate for each dwell period from the dwell period strain,
   determining a dwell period damage for each dwell period from the dwell period strain rate by using the ductility exhaustion curve;
   combining the ramp period damage for each ramp period and the dwell period damage for each dwell period to get the damage accumulated on the component during each load cycle;
   determining a total damage accumulated by summing the damage accumulated for each load cycle;
   determining a remaining useful life of the component by subtracting the total damage accumulated from a total available ductility; and
   comparing the remaining useful life of the component with a predetermined threshold and replacing the component based upon the result of the comparison.

9. The method of claim 8, wherein the remaining useful life is a percentage of the total available ductility relative to the total damage accumulated.

10. The method of claim 9, wherein the total available ductility is determined by using creep and tensile test data.

11. The method of claim 8, wherein the remaining useful life is determined for the component and simultaneously for other gas turbine engine components.

12. A method of service, wherein when to perform service on the gas turbine engine is determined by projecting when the component will reach a predetermined threshold of the remaining useful life determined by the method of claim 8.

* * * * *